Oct. 25, 1966  R. F. HELLBAUM  3,280,804
ROTARY ENGINE CONSTRUCTION
Filed July 9, 1964  3 Sheets-Sheet 1

INVENTOR
Richard F. Hellbaum
by McDougall, Hersh & Scott
Att'ys

INVENTOR
Richard F. Hellbaum
by McDougall, Hersh & Scott
Att'ys

Oct. 25, 1966  R. F. HELLBAUM  3,280,804
ROTARY ENGINE CONSTRUCTION
Filed July 9, 1964  3 Sheets-Sheet 3

INVENTOR
Richard F. Hellbaum
by McDougall, Hersh & Scott
Att'ys 3,280,804
ROTARY ENGINE CONSTRUCTION
Richard F. Hellbaum, 642-C Dresden Drive,
Newport News, Va.
Filed July 9, 1964, Ser. No. 381,312
11 Claims. (Cl. 123—14)

This invention relates to a rotary engine which may be used for a variety of applications. The engine of this invention is an engine of the type comprising inner and outer generally cylindrical members defining open spaces between their opposed surfaces. Combustion is caused to take place between the surfaces whereby relative rotary movement between the members can be accomplished. Shafts or other rotatable means are attached to one or both of the members whereby driving force can be transmitted.

It is well-known that engines, particularly of the internal combustion type, are characterized by rather poor efficiency. Thus, the energy capacity of the fuel employed in such engines is not utilized to an extremely large extent. Accordingly, new engine designs which improve the efficiency of the engine operations are extremely desirable.

It is one object of this invention to provide an engine design which is relatively simple in construction and operation whereby the engine can be produced at relatively low cost.

It is a further object of this invention to produce an engine design of the internal combustion type which is characterized by an extremely high efficiency of operation whereby the engine can be operated at a relatively low cost.

It is a still further object of this invention to provide an engine capable of achieving the above noted objects, which engine is of the rotary type.

These and other objects of this invention will appear hereinafter and for purposes of illustration, but not of limitation, specific embodiments of this invention are shown in the accompanying drawings in which:

FIGURE 1 is a vertical cross-sectional view of a rotary engine design characterized by the features of this invention;

FIGURES 2 through 7 comprise detail cross-sectional views illustrating different phases in a cycle of the engine operation;

Figure 1:
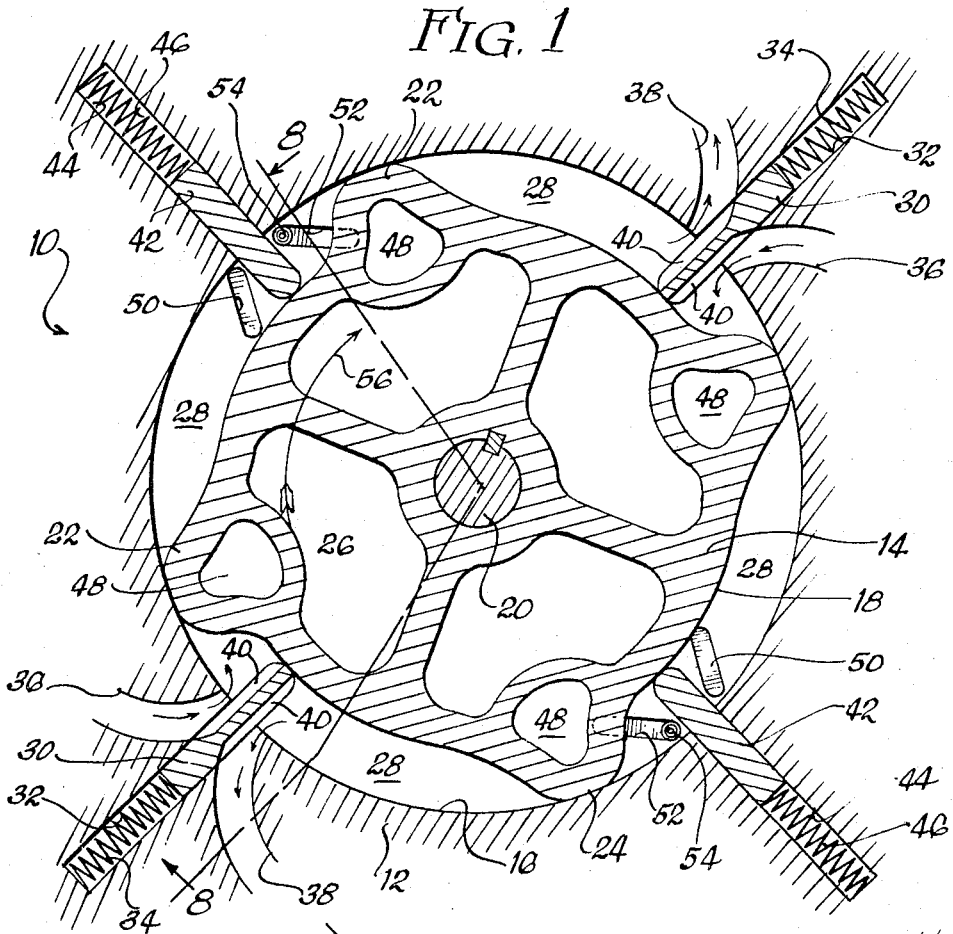

The rotary engine of this invention is of the type which includes an outer member defining cylindrical interior walls along with a coaxially mounted inner member defining cylindrical exterior walls spaced from said interior walls. Means are connected to at least one of these members whereby driving movement can be imparted due to the relative rotational movement which is effected between the members.

The rotary engine of this invention is characterized by lobes which are formed on one of the walls of one of the members. The ends of the lobes ride in engagement with the wall opposite the wall upon which they are formed. With this arrangement adjacent lobes, along with side walls defining the members, define a plurality of closed chambers in the engine construction.

Fuel intake openings are located at intervals in the construction and exhaust openings are located adjacent the fuel intake openings. Divider means are interposed between these openings so that fuel which is newly added will not come into contact with exhaust gases. The divider means are adapted to press into engagement with the wall of one of said members and are adapted to ride over the lobes. Accordingly, the dividers and the associated openings are periodically brought into contact with each of the chambers defined between the lobes.

Hollow spaces, preferably formed in the lobes, are also included in the construction. These spaces are employed for holding compresses gases which have not yet been consumed. The compressed gases are forced into a lobe and thereafter the gases are brought into contact with firing means, such as a spark plug. The firing takes place in a manner such that the gases expand in one of the chambers. The expansion of the gases imparts the driving movement for at least one of the members.

The accompanying drawings illustrate in cross section an engine construction 10 which includes an outer member 12 and an inner member 14. The outer member defines a cylindrical interior surface 16 while the inner member defines a cylindrical exterior surface 18.

The members 12 and 14 are coaxially mounted, and an open space is defined between their opposed surfaces. In the illustrated embodiment, the member 12 is held stationary while the member 14 is adapted to rotate relative to the member 12. The shaft 20 tied to the member 14 provides driving movement for use in any desired manner.

The member 14 is provided with four integrally formed lobes 22. These lobes include flat ends 24 whereby substantially gas-tight engagement between the lobes and the surface 16 can be achieved. These lobes along with the walls of the members 12 and 14 and the side walls 26 define four closed chambers 28.

Figure 10:
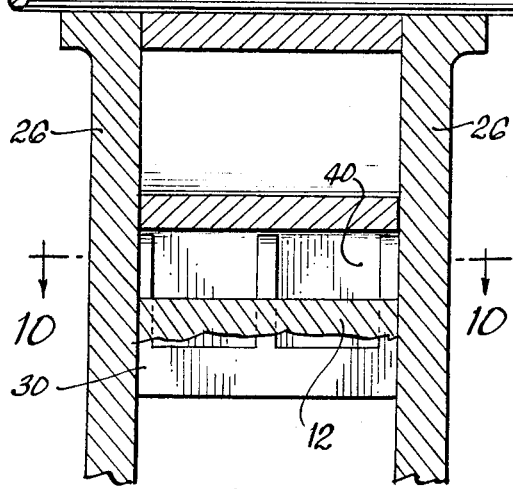
FIGURE 10 is a fragmentary cross-sectional view taken about the line 10—10 of FIGURE 8.
Figure 10:
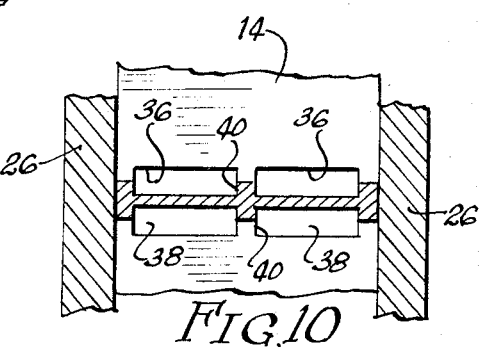

A first pair of blocks or dividers 30 are located at diametrically opposite positions in the construction. Each of these dividers 30 is reciprocally movable in a bore 32 defined in the member 12. A spring 34 located in the bore normally urges the dividers into engagement with the wall 18 of the member 14. The dividers extend across the entire width of the construction between the side walls 26 (see FIGURE 10) so that the dividers are effective to divide the chambers 28 into separate compartments when a divider is positioned in a particular chamber.

A fuel intake opening 36 is located adjacent each divider 30 so that fuel can enter a chamber 28. On the opposite side of a divider, there is provided an exhaust opening 38 whereby spent fuel can be removed from a chamber. In the particular construction illustrated (FIGURE 10) a pair of intake openings 36 and a pair of exhaust openings 38 are associated with each divider. The surfaces of the dividers are recessed at 40 to increase the size of the opening into a chamber 28.

A further pair of diametrically opposed dividers 42 are included in the construction. These dividers are reciprocally mounted in bores 44, and a spring 46 normally urges the dividers into engagement with the wall 18. These dividers press against the wall and ride on the lobes 22 in the manner described.

Figure 9:
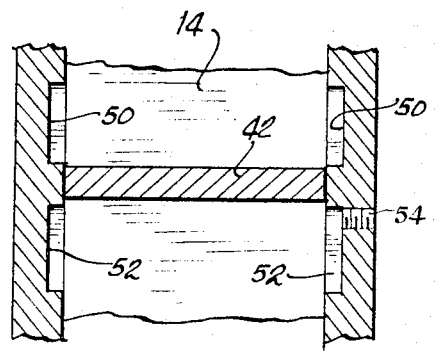
FIGURE 9 is a fragmentary cross-sectional view taken about the line 9—9 of FIGURE 8.

Each of the lobes 22 defines a hollow space 48, and these spaces are employed for holding compressed gases. The gases are introduced into the spaces by means of gouges 50 which are formed in the side walls 26 (see FIGURE 9). These gouges provide passages between a chamber 28 and a space 48. It will be noted that the gouges are dimensioned so that the ends of the gouges provide the necessary communication each time a lobe passes adjacent either gouge.

Additional gouges 52 are located on the opposite side of each divider 42. These gouges are adapted to recommunicate a hollow space 48 with a chamber 28. They thus permit the passage of compressed gases out of the chamber 48. A firing means 54, which may comprise a spark plug, is located in each gouge 52 whereby the fuel gases can be ignited when released from the space 48.

Figure 2:
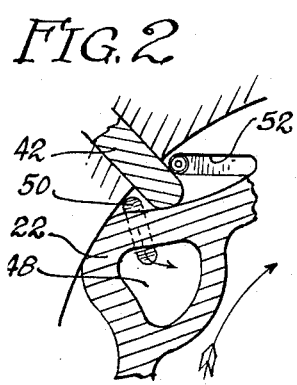

FIGURES 2 through 7 illustrate the phases in a typical operating cycle. An operating cycle can be best understood by referring to FIGURE 1 and by assuming that fresh fuel gases are located in the chamber 28 at the left-hand side of this figure. As suggested by the arrow 56, the member 14 is rotating clockwise and, accordingly, the lobe 22 illustrated at the lower end of this chamber will be moving toward the divider 42 located near the upper end of this chamber. It will be apparent that as this lobe approaches this divider, the gases in the chamber 28 will become compressed. The compression will continue until, as shown in FIGURE 2, the gouge 50 provides communication between this chamber 28 and the hollow space 48. At this time, the compressed gases are transferred to the hollow space 48.

Figure 3:
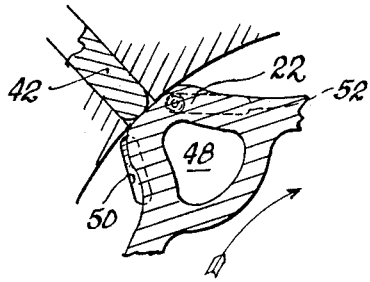
Figure 4:
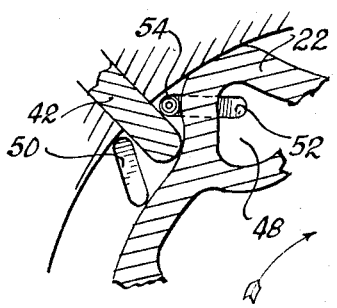
Figure 5:
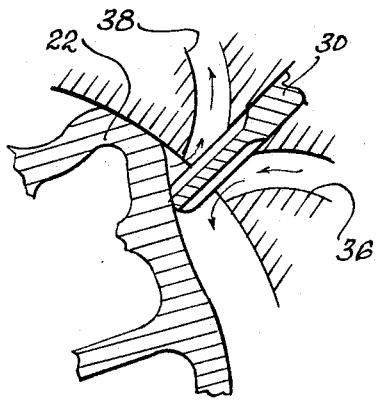

The small additional movement of the lobe 22 will cause the chamber 28 and the space 48 to be moved out of communication as shown in FIGURE 3. Still further movement will result in the relationship shown in FIGURE 4 wherein the gouge 52 communicates space 48 with a newly forming chamber 28. The spark plug 54 in this chamber is fired as the gases begin to enter the chamber or at some time after the gases are in the chamber. Accordingly, combustion will take place, and it will be apparent that thrust will be imparted to the lobe 22.

Figure 6:
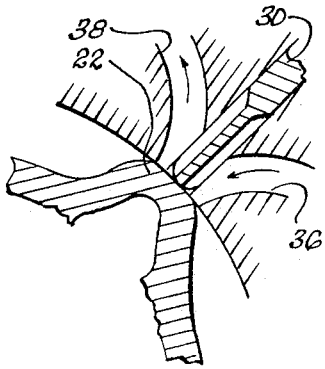
Figure 7:
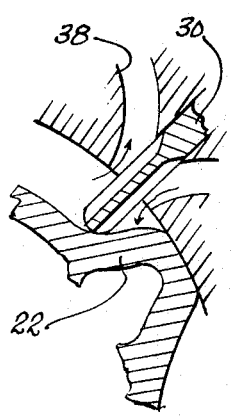
Figure 8:
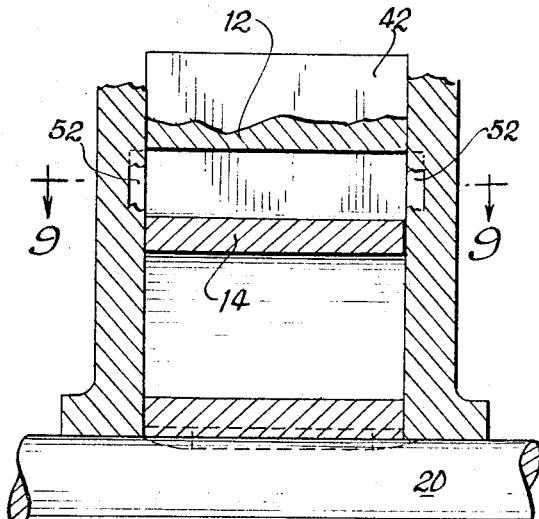
FIGURE 8 is a cross-sectional view taken about the line 8—8 of FIGURE 1.

Again referring to FIGURE 1, reference is made to the lobe 22 located at the top of the figure. The chamber 28 between this lobe and the divider 30 is filled with gases which were combusted in a previous phase of the operating cycle. As the upper lobe 22 proceeds toward the divider 30, the spent gases are forced out through exhaust opening 38. The lobe then proceeds past the divider 40 as shown in FIGURE 6 to the position shown in FIGURE 7. At this time, communication is provided with the opening 36, and fuel gases are drawn into the construction through this opening. The fuel gases may comprise an air-gas mixture of conventional characteristics.

It will be apparent that during each cycle of operation, two combustion phases are undertaken as well as two exhaust and fuel replenishing phases. It is obvious that the particular number of such phases, as controlled by the number of lobes and dividers, is not critical. The invention contemplates the use of different numbers of lobes, provided they are equally spaced apart on the movable member. Furthermore, different numerical combinations of dividers are clearly possible; however, dividers of a particular class must be equally spaced apart. Similarly, the dividers of different classes must alternate, and in the preferred form of the invention, all of the dividers are equally spaced-apart in the construction.

Figure 11:
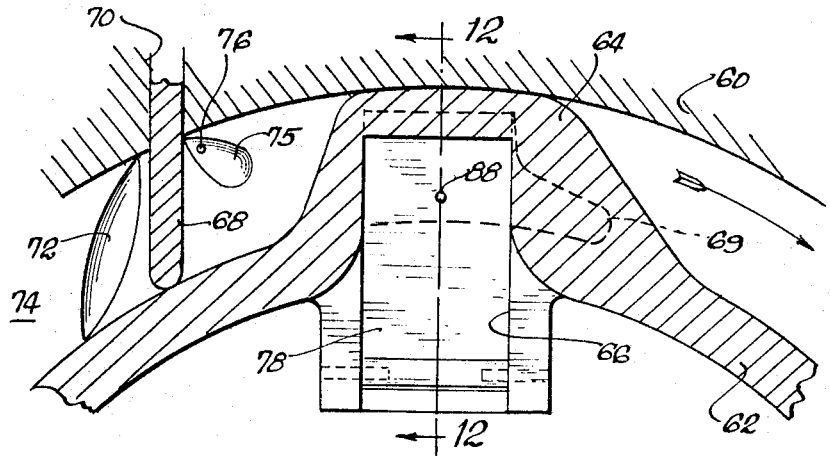
FIGURE 11 is a detail fragmentary view in section illustrating an alternative form of the construction; and, FIGURE 12 is a cross-sectional view taken about the line 12—12 of FIGURE 11.

FIGURE 11 illustrates an alternative form of the invention which includes a similar operation insofar as the control of the fuel and exhaust is concerned. In this construction, the inner and outer members 60 and 62 are of a construction similar to that described above. The inner members define a lobe 64 which in turn defines a large hollow space 66. A divider 68 is reciprocally mounted in bore 70 whereby the divider can operate in a manner corresponding to the dividers previously described.

The divider 68 is located between a gouge 72 which provides a passage means in the side wall 74. The space 66 includes a portion 69 which communicates with the passage defined by the gouge 72 whereby compressed fuel will be passed into the space 66. A second gouge 75 is formed in the side wall, and a firing means 76 is situated in this gouge. Accordingly, a passage is provided for the removal of compressed fuel gases and for the firing of the gases.

It will be noted that the space 66 is divided by means of a wall 78 into two portions 80 and 82. The wall 78 is hinged at 84 whereby the size of the portion 82 will be enlarged and reduced depending on the position of the wall.

Figure 12:
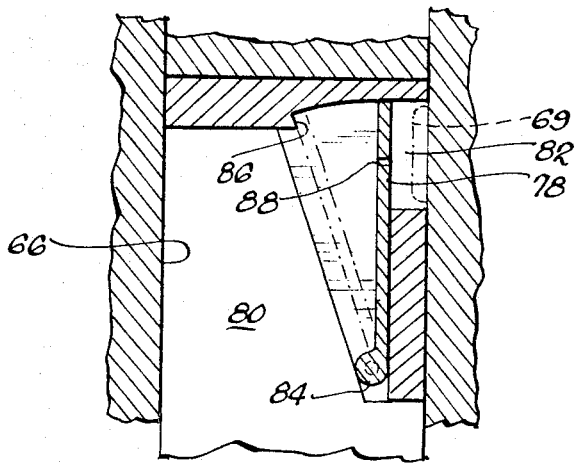

In the operation of the construction shown in FIGURES 11 and 12, pressurized gas is introduced into the portion 82, and the pressure of this gas forces the wall 78 to pivot thereby enlarging the portion 82. A stop 86 is employed for limiting the pivotal movement of the wall. When the portion 82 is exposed to the passage 75, the gas will flow out of this portion and become ignited in the manner previously described.

It will be noted that a port 88 is formed in the wall 78. Accordingly, the high pressure gas introduced into the portion 82 will tend to flow between this portion and the portion 80. Once the engine has been operating for a short period, the amount of gas in the portion 80 will be built-up to the point where the pressure of this gas will approximately equal the pressure of the gas forced into the portion 82. Under such conditions, the fresh gas forced into the portion 82 will comprise the gas combusted. Thus, the small size of the port 88 will avoid any significant mixing of the gases in the portions 80 and 82 during the operation of the engine under uniform conditions.

The design illustrated in FIGURES 11 and 12 is advantageous where it is desired to provide for rapid changes in r.p.m. during engine operation. For example, when the engine is started, the portion 80 will not contain fuel gas under high pressure. The high pressure gas introduced into the portion 82 will force the wall 78 to pivot to its limit, and most of this gas will then be combusted shortly thereafter. Some of the gas will, however, pass into the portion 80 to gradually build up the pressure therein. The greater pressure in the portion 80 will cause the wall 78 to pivot to its parallel position during combustion.

The described alternative is also desirable where changes in the amount of fuel gas introduced are effected during an engine operation. Such changes will be immediately responsible for changes in the pressure of gas in the portion 82; however, due to the small size of the port 88, there will not be an immediate change resulting in the portion 80. Accordingly, rapid changes in the amount of gas combusted can be effected quickly with this arrangement.

In order to achieve the desired operation, the wall 78 should be relatively light and movable in response to small variations in pressure. In place of the hinged wall, a piston mounting could be employed.

The rotary engine of this invention is considered to be of a highly desirable construction for several reasons. The engine incorporates a compression stroke in its operation while still preserving the recognized advantages of a rotary engine. The actual firing takes place in the expansion chamber of the described construction, and this has been found to be extremly efficient. This arrangement reduces attendant heat and energy losses to the walls of the construction and, accordingly, associated temperature and pressure losses are not significant. This feature also avoids the necessity for using high pressure seals which must be employed in an engine utilizing an external firing chamber.

In the operation of the described engine, there is no gas burned or expelled without this gas being subjected to conditions causing it to release its energy in the firing and expansion chamber. The multiple firing positions which characterize the described engine also provide advantages since a high power to weight ratio and a high power to friction ratio can be achieved. The described constructions provide an opportunity for utilizing compact motor designs while achieving extremely high fuel efficiency, as well as highly satisfactory power.

It will be understood that various changes and modifications may be made in the constructions described which provide the characteristics of this invention without depart- That which is claimed is:

1. In a rotary engine comprising an outer member defining cylindrical interior walls, a coaxially mounted inner member defining cylindrical exterior walls spaced from said interior walls, and means connected to at least one of said members adapted to be rotated due to relative movement between said members, the improvement comprising: lobes formed at regular spaced intervals on one of said walls, the ends of said lobes engaging the opposite wall to thereby define a plurality of closed chambers between said walls, fuel intake openings adapted to communicate with said chambers, exhaust openings adjacent said intake openings and divider means interposed between said openings, said divider means pressing against said one wall and riding over said lobes whereby fuel and exhaust gases are maintained separate in said chambers, hollow spaces defined in the member carrying said lobes for holding compressed fuel gases, first passage means adapted to communicate said spaces with said chambers to permit entry of fuel gases into said spaces, second passage means adjacent said first passage means adapted to communicate said spaces with said chambers to permit passage of fuel gases out of said spaces, additional divider means interposed between said passage means and means in said second passage means for igniting fuel passing into said second passage means.

2. An engine in accordance with claim 1 wherein a plurality of said first mentioned divider means, spaced at regular intervals, are provided, and including a plurality of said additional divider means, spaced at regular intervals, said divider means being disposed in alternating fashion in said engine.

3. An engine in accordance with claim 2 wherein four of said lobes are provided, and wherein two of each type of said dividers are provided with all of the dividers being situated at regularly spaced apart intervals.

4. In a rotary engine comprising an outer member defining cylindrical interior walls, a coaxially mounted inner member defining cylindrical exterior walls spaced from said interior walls, means connected to said inner member adapted to be rotated due to movement of said inner member relative to said outer member, the improvement comprising: lobes formed in the exterior walls of said inner member, said lobes being located at regularly spaced apart intervals with the ends of said lobes engaging the interior wall of said outer member to thereby define a plurality of closed chambers between said walls, fuel intake openings adapted to communicate with said chambers, exhaust openings adjacent said intake opening and divider means interposed between said openings, said divider means pressing against said one wall and riding over said lobes whereby fuel and exhaust gases are maintained separate in said chambers, hollow spaces defined in the member carrying said lobes for holding compressed fuel gases, first passage means adapted to communicate said spaces with said chambers to permit entry of fuel gases into said spaces, second passage means adjacent said first passage means adapted to communicate said spaces with said chambers to permit passage of fuel gases out of said spaces, additional divider means interposed between said passage means and means in said second passage means for igniting fuel passing into said second passage means.

5. An engine in accordance with claim 4 wherein a plurality of said first mentioned divider means, spaced at regular intervals, are provided, and including a plurality of said additional divider means, spaced at regular intervals, said divider means being disposed in alternating fashion in said engine.

6. An engine in accordance with claim 5 wherein four of said lobes are provided, and wherein two of each type of said dividers are provided with all of the dividers being situated at regularly spaced apart intervals.

7. An engine in accordance with claim 4 wherein said fuel intake and exhaust openings are defined in said interior wall and wherein said divider means are reciprocally movable in openings defined by said interior walls.

8. An engine in accordance with claim 7 including side walls dimensioned to approximately correspond to the width of said inner member whereby said chambers are maintained closed by said side walls, and wherein said passage means comprise elongated depressions formed in said side walls.

9. In a rotary engine comprising an outer member defining cylindrical interior walls, a coaxially mounted inner member defining cylindrical exterior walls spaced from said interior walls, and means connected to one of said members adapted to be rotated due to relative movement between said members, the improvement comprising: a plurality of lobes formed at regular spaced intervals on said exterior walls, the ends of said lobes engaging the interior walls to thereby define a plurality of closed chambers between said walls, fuel intake openings defined by said interior walls adapted to communicate with said chamber, exhaust openings defined by said interior walls located adjacent said intake openings, and first divider means interposed between said openings, said first divider means pressing against said exterior wall and riding over said lobes whereby fuel and exhaust gases are maintained in separate chambers, said first divider means being located at regular spaced intervals around said interior wall, said first divider means being reciprocally movably with respect to said openings defined in said interior walls, hollow spaces defined in said lobes, first passage means adapted to communicate said spaces with said chambers to permit entry of fuel gases into said spaces, second passage means adjacent said first passage means adapted to communicate said spaces with said chambers to permit passage of fuel gases out of said spaces, additional divider means interposed between said passage means, said additional divider means being located at regular spaced intervals in said engine and being reciprocally movable in openings defined in said interior walls, and means in said second passage means for igniting fuel passing into said second passage means.

10. An engine in accordance with claim 9 wherein said lobes are integrally formed at 90° intervals on said inner member, and wherein said hollow spaces comprise openings defined by each of said lobes.

11. In a rotary engine comprising an outer member defining cylindrical interior walls, a coaxially mounted inner member defining cylindrical exterior walls spaced from said interior walls, and means connected to said inner member adapted to be rotated due to relative movement between said members, the improvement comprising: lobes formed at regular spaced intervals on one of said walls, the ends of said lobes engaging the opposite wall to thereby define a plurality of closed chambers between said walls, fuel intake openings adapted to communicate with said chambers, exhaust openings adjacent said intake openings and first divider means interposed between said openings, said first divider means pressing against said one wall and riding over said lobes whereby fuel and exhaust gases are maintained separate in said chambers, hollow spaces for compressed fuel gases defined by said lobes, first passage means adapted to communicate said spaces with said chambers to permit entry of fuel gases into said spaces, second passage means adjacent said first passage means adapted to communicate said spaces with said chambers to permit passage of said fuel gases out of said spaces, a movable wall in each of said spaces, said wall dividing said spaces into two portions, said wall being movable to expand a first portion in said spaces to thereby provide for entry of fuel gases therein, and said wall being movable to decrease the size of said first portion during passage of fuel gases out of said spaces, the second portion of said spaces containing fuel gases, and a small opening adapted to communicate said first and second portions to equalize the pressure between said portions during an engine cycle, additional divider means interposed between said passage means and means in said second passage means for igniting fuel passing therethrough.

References Cited by the Examiner

UNITED STATES PATENTS

| | | | |
|---|---|---|---|
| 749,654 | 1/1904 | Banta et al. | 123—14 |
| 1,402,057 | 1/1922 | Davis | 123—14 |
| 1,859,618 | 5/1932 | Cleland | 123—14 |

MARK NEWMAN, *Primary Examiner.*

SAMUEL LEVINE, *Examiner.*

A. S. ROSEN, *Assistant Examiner.*